Feb. 14, 1933.                P. M. YOUNG                1,897,599
                          COFFEE BIN AND HOPPER
                            Filed June 2, 1931
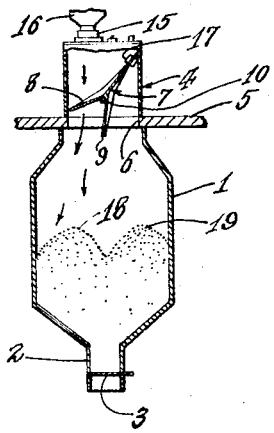
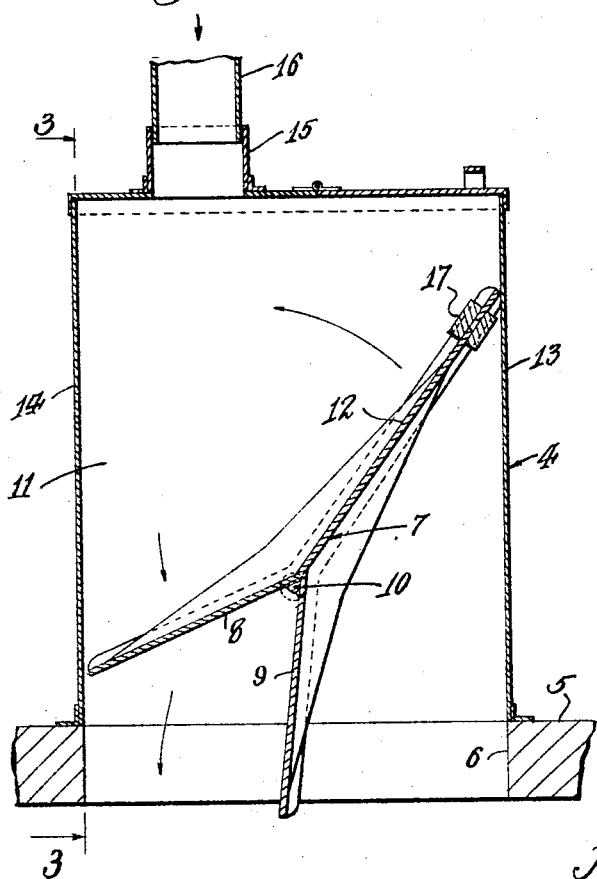
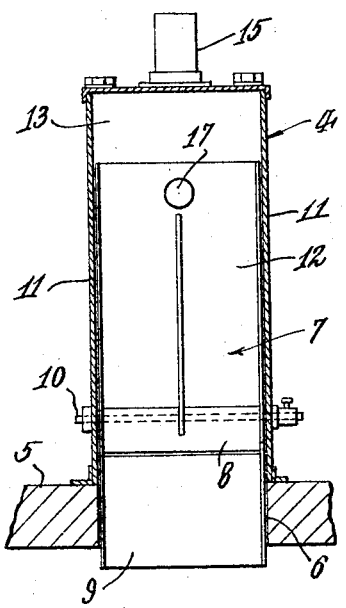
Inventor
Peter M. Young
By Lyon & Lyon
Attorneys Patented Feb. 14, 1933

1,897,599

UNITED STATES PATENT OFFICE

PETER M. YOUNG, OF LOS ANGELES, CALIFORNIA

COFFEE BIN AND HOPPER

Application filed June 2, 1931. Serial No. 541,621.

This invention relates to apparatus for handling ground coffee. In handling ground coffee preparatory to placing it in packages, it is usually dumped into a bin having a delivery spout at a low level. The ground coffee is withdrawn from the spout and placed in packages for selling the coffee at retail. Ground coffee carries a certain amount of chaff, and when the ground coffee is dumped into a bin in the ordinary way, the chaff tends to accumulate against the wall of the bin, and also tends to adhere to the wall of the bin. In this way, considerable quantities of chaff may accumulate on the side walls of the bin and from time to time it falls off, the result being that packages of coffee sometimes have an unusually large amount of chaff in the coffee. There is also a tendency for the more finely ground coffee to separate itself from the coarse.

In some apparatus for handling coffee, the bin is continuously jarred so as to prevent the chaff from adhering to the side walls of the bin, but this is objectionable because it is noisy and entails additional expense in the apparatus.

The general object of the invention is to provide means for use in handling ground coffee for enabling the coffee to be placed in packages that will overcome the difficulties suggested above, and which will maintain the chaff substantially uniformly distributed throughout the mass of ground coffee. While the invention is particularly applicable in connection with the handling of ground coffee, it may be useful in any situation where a light substance, such as chaff, must be handled with the substance without separating out the chaff from the mass of the substance.

A further object of the invention is to provide a dumping hopper and bin cooperating in such a way that when the ground coffee is dumped from the hopper into the bin, it will not be dumped always at the same spot. When this occurs, the ground coffee tends to form a large cone with its peak directly under the hopper. This condition is favorable to separating the chaff from the coffee, and separating the finely ground coffee from the coarse.

A further object of the invention is to provide a bin and hopper in which the hopper is provided with a dumping bottom operating in such a way as to dump the coffee alternately at two different points at the bin bottom; also to provide the hopper with a dumping bottom which is capable of assuming two different positions in one of which the bottom dumps the ground coffee while the hopper is receiving another charge of the coffee, and to provide a construction whereby the charge of coffee on the hopper bottom will automatically dump itself and swing the gate or bottom of the hopper into a new receiving position.

Further objects of the invention will appear hereinafter.

The invention consists of novel parts and combinations of parts to be described hereinafter, all of which contribute to produce an efficient coffee bin and hopper.

A preferred embodiment of the invention is described in the following specification, while the broad scope of the invention is pointed out in the appended claims.

In the drawing—

Figure 1 is a diagrammatic view upon a relatively small scale, illustrating a bin and hopper embodying my invention—this view is a vertical section;

Figure 2 is a vertical section taken through the hopper; and

Figure 3 is a section taken about on the line 3, 3 of Figure 2; Figures 2 and 3 are upon an enlarged scale as compared to Figure 1.

Referring more particularly to the parts and especially to Figure 1, 1 represents a bin which may be of any suitable form and which operates to receive ground coffee for delivery through a spout 2 for packaging the coffee. This spout may be controlled by a butterfly valve 3. In practicing the invention, I provide over the mouth of the bin a hopper 4. This hopper is preferably of box form and may, if desired, have its lower edge supported on a floor 5 at an opening 6 directly over the mouth of the bin. In the box 4, I mount a dumping bottom constructed in such a way that it will support a quantity of ground coffee and dump each charge of coffee at a different point on the bin bottom. For this purpose, I prefer to provide a gate 7 in the hopper and this gate is preferably formed of two gate plates 8 and 9 that form an angle with each other. At the apex of the angle, the gate is supported on a pivot preferably by means of a shaft 10 that extends through the material of the gate, the ends of the shaft being supported in the side walls 11 of the hopper. The upper portion of the gate 7 is formed into an upper plate 12 that extends up from the pivot point 10, and the upper end of this plate 12 lies substantially against one of the side walls 13 of the hopper, while the corresponding gate plate 8 has its lower edge substantially engaging the opposite wall 14.

The hopper is provided with a charging neck 15 through which a charging spout 16 delivers the ground coffee. If desired, the upper plate 12 may be provided with a counter-weight 17 to counter-balance the coffee received on the bottom 7 and to determine substantially what amount of weight the bottom will support before dumping the coffee. In the operation of the device, when the coffee is admitted to the hopper (see Figure 2), it will accumulate on the gate plate 8 and the upper plate 12 until a sufficient quantity of coffee is held on the gate over-balancing the weight of the counterweight and the plate 12, whereupon the coffee will cause the gate to swing on its pivot at 10 in the direction of the arrow. This will permit the coffee to descend into the bin, forming a pile such as the pile 18 (see Figure 1) at the left side of the bin. In a similar way, the gate will operate, using the gate plate 9 as part of bottom, to support a charge of coffee on the other side of the hopper and such a charge when dumped would descend at another point in the bin and form a second pile such as the pile 19. By reason of the fact that two piles, or cones, of the ground coffee are formed in this way, the upper surface of the ground coffee in the bin is comparatively level and I avoid the effect of having a large cone presenting a relatively long upper face at which the descending coffee would tend to separate the chaff from the coffee proper. By practicing the invention, it will be found that the chaff in the coffee will maintain itself substantially uniformly distributed throughout the mass of coffee, and a substantially uniform distribution of the fine and coarse grains of the coffee is maintained.

It is understood that the embodiment of the invention described herein is only one of the many embodiments this invention may take, and I do not wish to be limited in the practice of the invention, nor in my claims, to the particular embodiment set forth.

I claim:

1. In an apparatus for handling ground coffee or other substances containing chaff, the combination of a bin operating as a holder for the coffee, and having means at its lower end for withdrawing the coffee, a dumping hopper mounted over the bin for receiving and holding a quantity of coffee, a dumping gate pivotally mounted in the hopper and having two gate plates cooperating respectively alternately with the opposite walls of the hopper so that in one position of the gate ground coffee will become dumped from one side of the gate into the bin, and in the other position of the gate the coffee will be dumped from the other side of the gate into the bin, thereby collecting the dumped coffee in different separated piles on the bin bottom and reducing the tendency of the chaff to separate itself from the mass of ground coffee.

2. In an apparatus for handling ground coffee or other substances containing chaff, the combination of a bin operating as a holder for the coffee, and having means at its lower end for withdrawing the coffee, a dumping hopper mounted over the bin, a dumping gate mounted to rock on a substantially horizontal axis in the hopper and having two gate plates disposed at an angle to each other, said gate having an upper plate extending upwardly from the said axis of rotation, and cooperating with said gate-plates alternately to form a bottom for the hopper to receive and retain a quantity of the ground coffee, one of said gate-plates operating to dump the coffee when the other gate-plate is set to receive the coffee, said gate-plates operating to dump the coffee so as to form two different piles of the coffee at separated points on the bin bottom, thereby reducing the tendency of the chaff to separate itself from the mass of ground coffee.

3. In an apparatus for handling ground coffee or other substances containing chaff, the combination of a bin having means at its lower end for withdrawing the coffee, a dumping hopper mounted over the bin, a dumping gate pivotally mounted in the hopper and having two gate-plates forming an angle with each other, a transverse horizontal pivot in the hopper located substantially at the apex of the angle between the gate-plates for enabling the gate-plates to cooperate respectively with opposite walls of the hopper to receive and retain a quantity of the coffee, and an upper plate extending upwardly from the said pivot to engage the side walls of the hopper and cooperate with the gate-plates alternately to form a dumping bottom for the hopper, said upper plate including means for counter-balancing a portion of the coffee supported in the hopper.

Signed at Los Angeles, California, this 25th day of May 1931.

PETER M. YOUNG.